(12) United States Patent
Yanagihara et al.

(10) Patent No.: US 11,329,350 B2
(45) Date of Patent: May 10, 2022

(54) BUS BAR MODULE AND METHOD FOR ASSEMBLING BUS BAR MODULE

(71) Applicant: YAZAKI CORPORATION, Tokyo (JP)

(72) Inventors: Shinichi Yanagihara, Kakegawa (JP); Takuto Goto, Kakegawa (JP)

(73) Assignee: YAZAKI CORPORATION, Tokyo (JP)

(*) Notice: Subject to any disclaimer, the term of this patent is extended or adjusted under 35 U.S.C. 154(b) by 426 days.

(21) Appl. No.: 16/596,968

(22) Filed: Oct. 9, 2019

(65) Prior Publication Data
US 2020/0119326 A1 Apr. 16, 2020

(30) Foreign Application Priority Data
Oct. 10, 2018 (JP) .............................. JP2018-191908

(51) Int. Cl.
*H01M 50/502* (2021.01)
*H01M 50/20* (2021.01)
*H01M 50/507* (2021.01)
*H01M 50/516* (2021.01)
*H01M 50/519* (2021.01)
*H01M 50/298* (2021.01)

(52) U.S. Cl.
CPC ......... *H01M 50/502* (2021.01); *H01M 50/20* (2021.01); *H01M 50/298* (2021.01); *H01M 50/507* (2021.01); *H01M 50/516* (2021.01); *H01M 50/519* (2021.01); *H01M 2220/20* (2013.01)

(58) Field of Classification Search
None
See application file for complete search history.

(56) References Cited

U.S. PATENT DOCUMENTS

| 2014/0017533 | A1 | 1/2014 | Nishihara et al. |
| 2014/0287286 | A1 | 9/2014 | Miyawaki et al. |
| 2016/0043446 | A1* | 2/2016 | Fritz ................... H01M 10/482 429/90 |
| 2016/0322624 | A1* | 11/2016 | Ichikawa ............. H01M 50/20 |
| 2019/0088918 | A1* | 3/2019 | Goh .................... H01M 10/425 |

FOREIGN PATENT DOCUMENTS

| JP | 2014-182945 A | 9/2014 |
| JP | 2015-022965 A | 2/2015 |
| WO | 2012131809 A1 | 10/2012 |

* cited by examiner

*Primary Examiner* — Gregg Cantelmo
(74) *Attorney, Agent, or Firm* — Sughrue Mion, PLLC

(57) ABSTRACT

A bus bar module includes a case assembled to a battery assembly including single cells, a bus bar held in the case and fastened to electrodes of the single cells, a circuit body connected to the bus bar and is wired in the case, and a circuit board to which the circuit body is connected. The case includes a case main body including a board accommodation space, and a lid body attached to one side at which the board accommodation space in the case main body is open. The circuit body is led from an opening portion into the board accommodation space, the opening portion being formed on a surface of the other side opposite to the one side of the board accommodation space in the case main body. The circuit body is soldered to the circuit board from the one side.

5 Claims, 13 Drawing Sheets

BUS BAR MODULE AND METHOD FOR ASSEMBLING BUS BAR MODULE

CROSS-REFERENCE TO RELATED APPLICATIONS

This application is based on and claims priority under 35 USC 119 from Japanese Patent Application No. 2018-191908 filed on Oct. 10, 2018, the contents of which are incorporated herein by reference.

TECHNICAL FIELD

The present disclosure relates to a bus bar module and a method for assembling a bus bar module.

BACKGROUND ART

For example, a power supply device mounted on various vehicles such as an electric automobile which travels using an electric motor or a hybrid automobile which travels using an engine and an electric motor in combination is configured by assembling a bus bar module including a bus bar connected to electrodes of a plurality of single cells configuring a battery assembly.

As the bus bar module, there has been known a bus bar module in which a circuit board for cell monitoring for monitoring a voltage and a temperature of a single cell is provided in a case, and an electric wire for detecting a voltage or an electric wire extending from a thermistor which detects a temperature of a single cell connected to a bus bar is connected to the circuit board (see, for example, JP 2014-182945 A).

In the bus bar module described above, the electric wire is electrically connected to the circuit board by joining an electric wire side connector provided at an end portion of the electric wire to a board side connector mounted on the circuit board.

For this reason, in the bus bar module, it is necessary to perform a joining work of manually joining the electric wire side connector to the board side connector, and an improvement in assembly work efficiency is desired. In addition, in the bus bar module, since the electric wire side connector is provided on the electric wire and the board side connector is mounted on the circuit board, the number of components is increased, which leads to an increase in cost. Since the board side connector to which the electric wire side connector is joined is mounted on the circuit board, a size of the case is increased due to bulkiness of the circuit board.

SUMMARY OF INVENTION

The present disclosure is to provide a bus bar module and a method for assembling a bus bar module which can improve assembly work efficiency and can reduce cost, a size and weight.

A bus bar module includes a case assembled to a battery assembly including single cells, a bus bar held in the case and fastened to electrodes of the single cells, a circuit body connected to the bus bar and is wired in the case, and a circuit board to which the circuit body is connected. The case includes a case main body including a board accommodation space, and a lid body attached to one side at which the board accommodation space in the case main body is open. The circuit body is led from an opening portion into the board accommodation space, the opening portion being formed on a surface of the other side opposite to the one side of the board accommodation space in the case main body. The circuit body is soldered to the circuit board from the one side. As compared with a structure having a male and female fitting connector, it is possible to eliminate a need for the pair of connectors to be fitted to each other, and to reduce cost, a size and weight due to a reduction in the number of components.

According to the present invention, it is possible to provide the bus bar module and the method for assembling a bus bar module which can improve the assembly work efficiency, and reduce the cost, the size and weight.

The present disclosure has been briefly described above. Details of the present disclosure will be further clarified by reading a mode (hereinafter, referred to as "embodiment") for carrying out the present disclosure described below with reference to the accompanying drawings.

DESCRIPTION OF EMBODIMENTS

Hereinafter, an embodiment of the present disclosure will be described with reference to the drawings.

Figure 1:
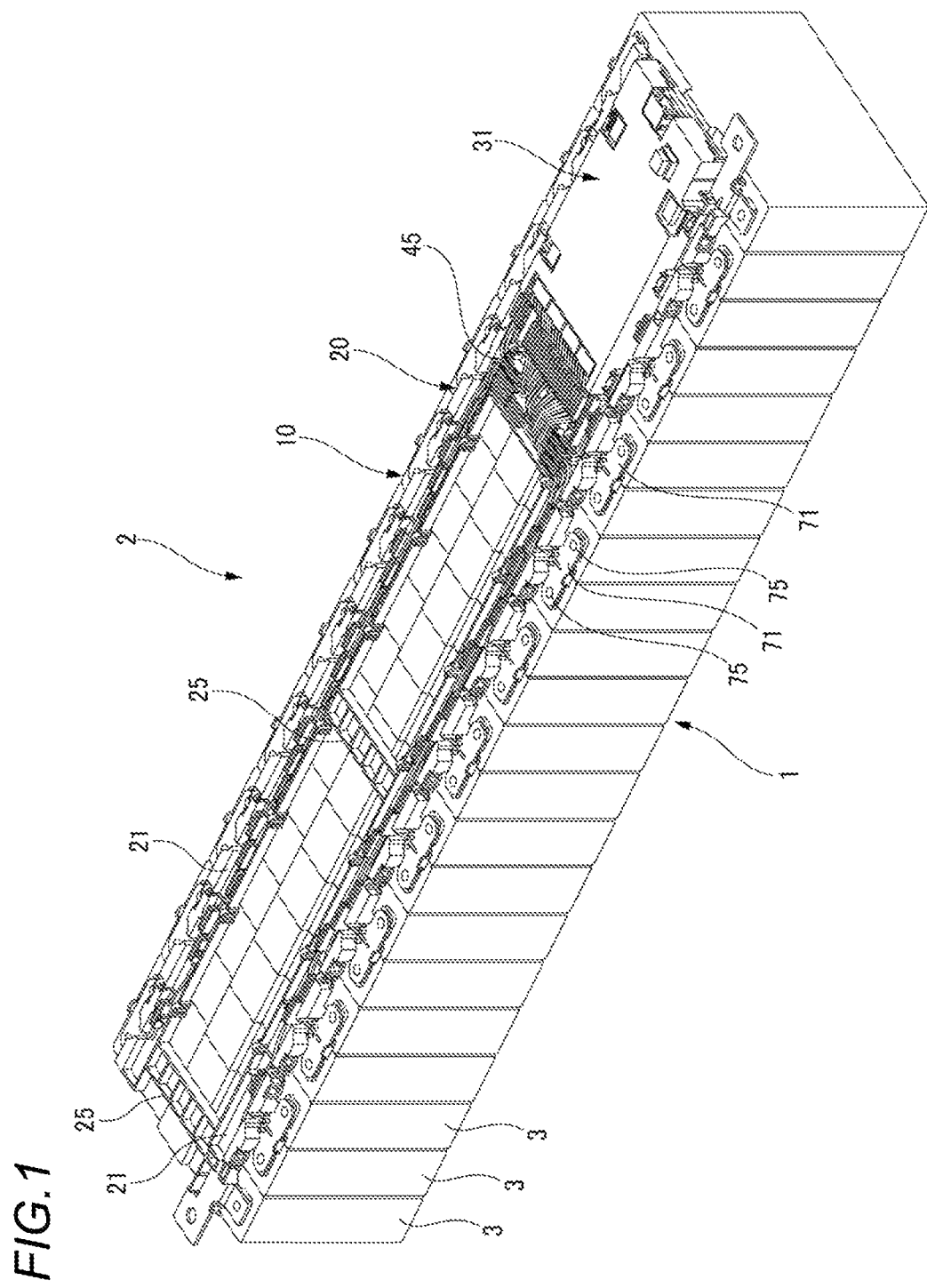
FIG. 1 is a perspective view of a power supply device in which a bus bar module according to the present embodiment is attached to a battery assembly.
Figure 2:
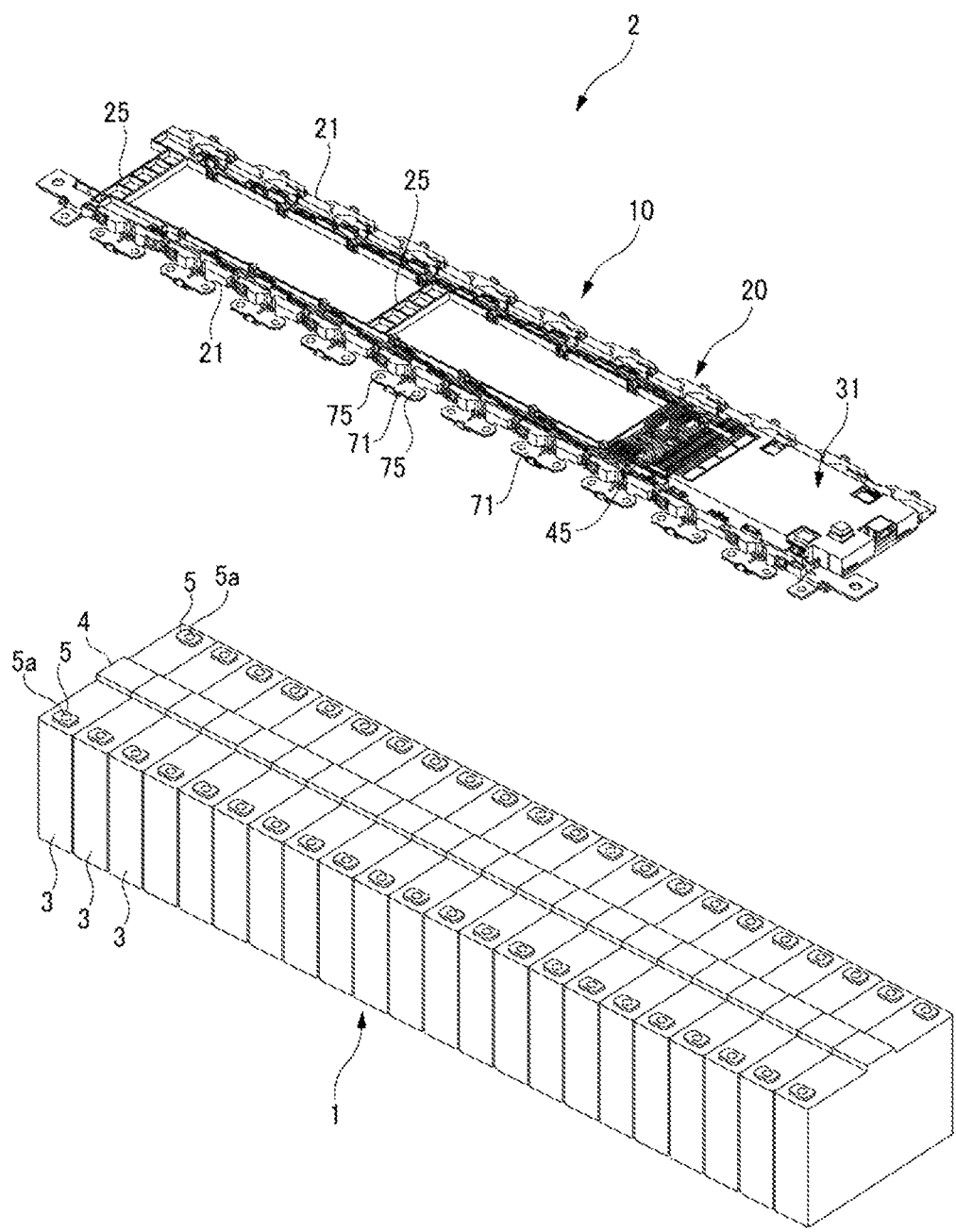
FIG. 2 is a perspective view of the bus bar module and the battery assembly according to the present embodiment.

FIG. 1 is a perspective view of a power supply device in which a bus bar module according to the present embodiment is attached to a battery assembly. FIG. 2 is a perspective view of the bus bar module and the battery assembly according to the present embodiment.

As shown in FIGS. 1 and 2, a bus bar module 10 according to the present embodiment is assembled to an upper portion of a battery assembly 1 to configure a power supply device 2. The power supply device 2 is mounted and used on various vehicles such as an electric automobile which travels using an electric motor, or a hybrid automobile which travels using an engine and an electric motor in combination, and supplies power to the electric motor.

The battery assembly 1 includes a plurality of single cells 3 arranged in a row along one direction and fixed to each other. Each of the single cells 3 includes a rectangular parallelepiped battery main body 4, and a pair of electrodes 5 provided near one end and the other end of an upper surface of the battery main body 4. One of the pair of electrodes 5 is a positive electrode and the other is a negative electrode. The single cells 3 are arranged such that the battery main bodies 4 are in contact with each other. The single cells 3 are disposed such that poles of the electrodes 5 are alternately arranged.

Figure 3:
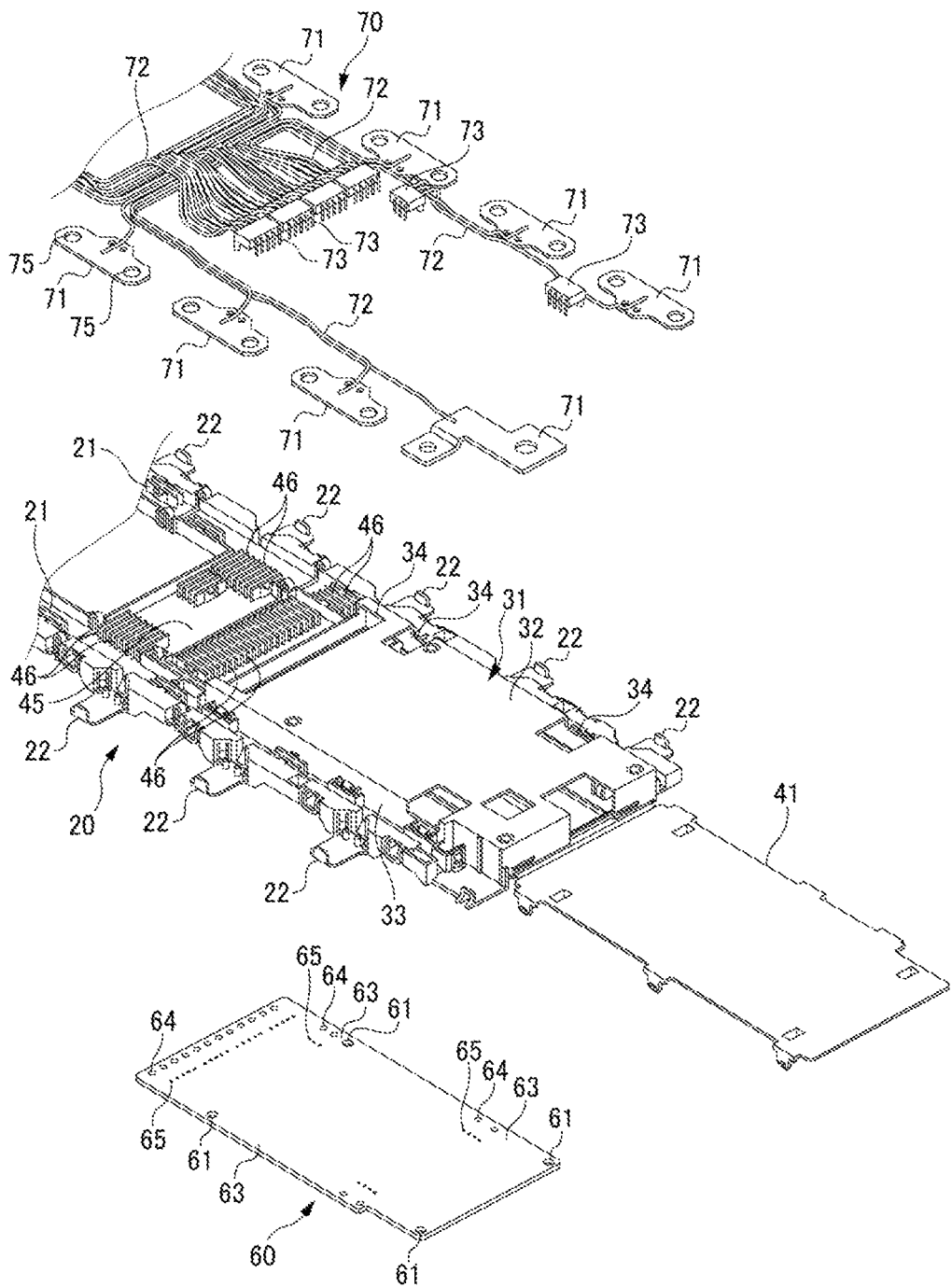
FIG. 3 is an exploded perspective view of the bus bar module as viewed from a front surface side.
Figure 4:
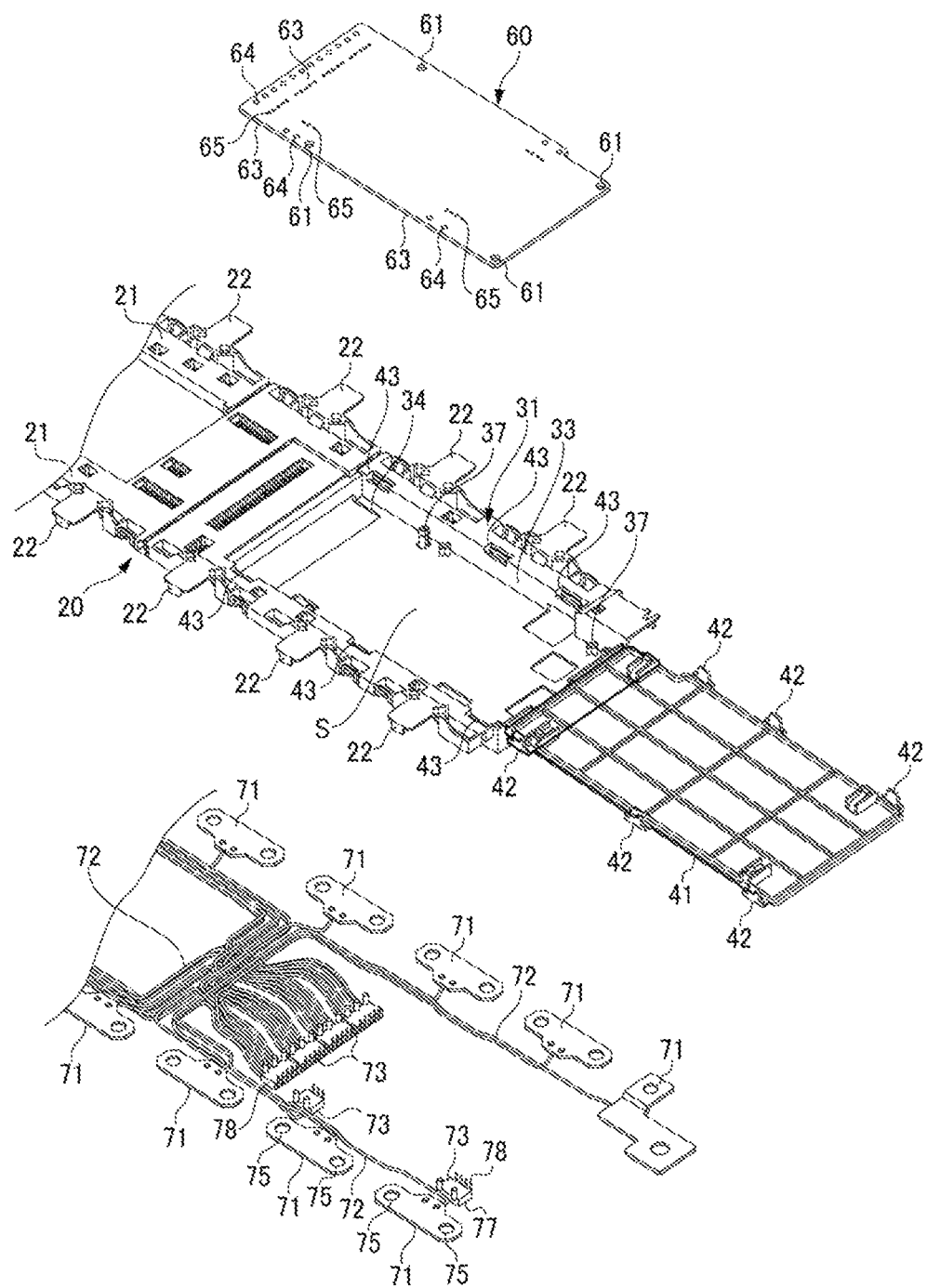
FIG. 4 is an exploded perspective view of the bus bar module as viewed from a back surface side.

FIG. 3 is an exploded perspective view of the bus bar module as viewed from a front surface side. FIG. 4 is an exploded perspective view of the bus bar module as viewed from a back surface side.

As shown in FIGS. 3 and 4, the bus bar module 10 includes a case 20, bus bars 71, electric wires (circuit body) 72, and a circuit board 60.

The case 20 is integrally formed of, for example, a synthetic resin or the like. The case 20 has two rows of electric wire accommodation portions 21. A plurality of bus bar holding portions 22 projecting laterally are formed in the electric wire accommodation portions 21. The bus bar holding portions 22 are provided at intervals along an arrangement direction of the single cells 3. A connection band portion 25 and a case main body 31 are integrally provided between the electric wire accommodation portions 21. Further, the electric wire accommodation portions 21 are connected to each other by the connection band portion 25 and the case main body 31, and are arranged in parallel (see FIGS. 1 and 2).

The case main body 31 is provided on one end side of the case 20. The case main body 31 is formed in a concave shape in which a back surface side (a surface of one side), which is an attaching side to the battery assembly 1, is open. In addition, a lid body 41 is provided on one end side of the case main body 31.

The case main body 31 formed in this concave shape includes a plate-like portion 32 including a rectangular shape in a plan view, and a peripheral wall portion 33 formed on a peripheral edge portion of the plate-like portion 32, and an inner portion thereof is used as a board accommodation space S. A plurality of opening portions 34 are formed on the plate-like portion 32. The opening portions 34 are formed on the other end side and one lateral side of the case main body 31. In addition, board locking portions 37 projecting inward are erected on the plate-like portion 32 along the peripheral wall portion 33.

The lid body 41 provided on one end side of the case main body 31 is rotatably connected to the peripheral wall portion 33 of the case main body 31, and is rotated at a connection position with the case main body 31 to open or close the board accommodation space S of the case main body 31. Locking claws 42 are formed on both side portions of the lid body 41, and lock locking portions 43 formed on the case main body 31. The lid body 41 is rotated toward an open side (the one side) of the board accommodation space Sin the case main body 31, so that the locking claws 42 lock the locking portions 43. Accordingly, the board accommodation space S of the case main body 31 is closed by the lid body 41.

On the other end side of the case main body 31, an electric wire alignment portion 45 is provided on a surface side (a surface of the other side) of the case 20. A plurality of alignment plate portions 46 are formed in the electric wire alignment portion 45, and the electric wires 72 are fitted and aligned between the alignment plate portions 46.

Figure 5:
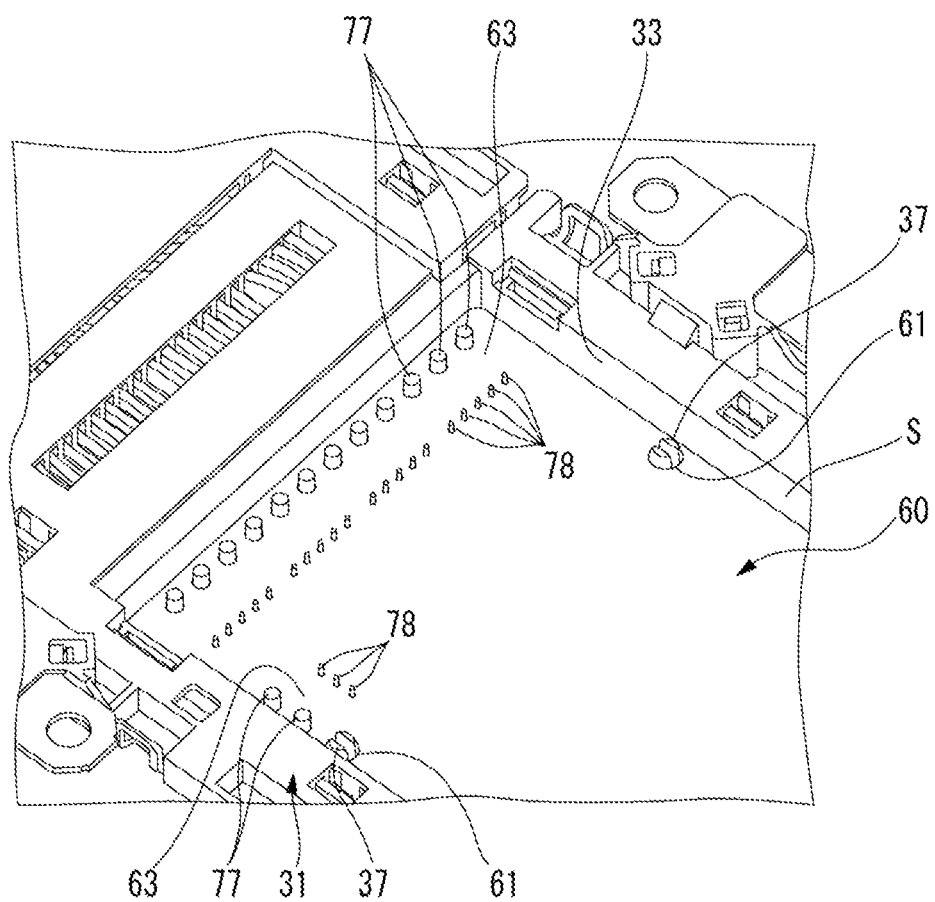
FIG. 5 is a perspective view of a part of a circuit board accommodated in a board accommodation space of a case main body.
Figure 6:
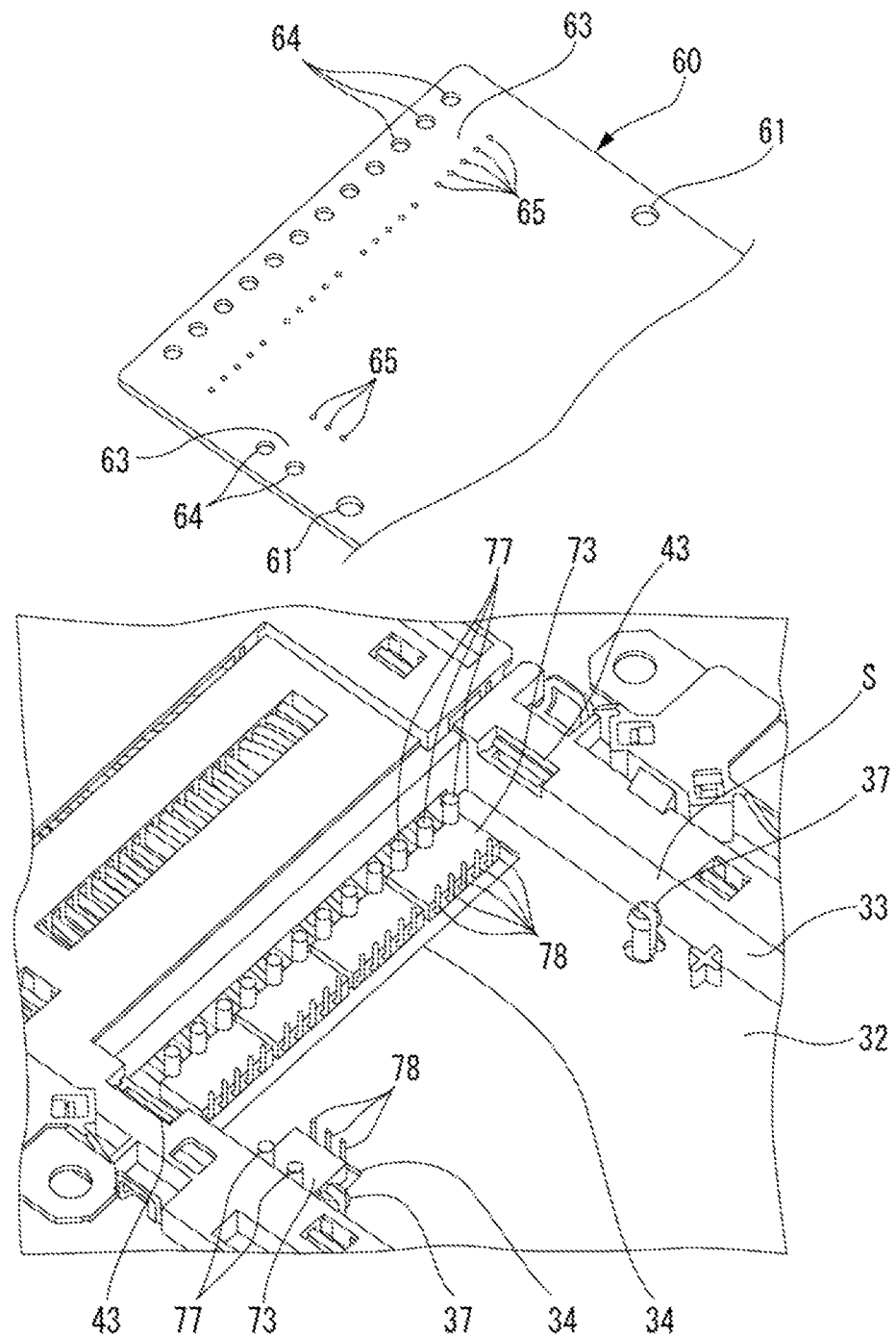
FIG. 6 is a perspective view of parts of the case main body and the circuit board.

FIG. 5 is a perspective view of a part of the circuit board accommodated in the board accommodation space of the case main body. FIG. 6 is a perspective view of parts of the case main body and the circuit board.

As shown in FIGS. 5 and 6, the circuit board 60 is assembled from a back surface side of the case 20 to the board accommodation space S of the case main body 31 and accommodated therein. The circuit board 60 is a printed wiring board formed in a rectangular shape, and includes a voltage monitoring circuit and a temperature monitoring circuit. Locking holes 61 are formed in the circuit board 60, and the board locking portions 37 of the case main body 31 are inserted into the locking holes 61. As a result, the locking holes 61 are locked by the board locking portions 37, so that the circuit board 60 is fixed in a state of being accommodated in the board accommodation space S of the case main body 31. The open side of the board accommodation space S accommodating the circuit board 60 is closed by the lid body 41, so that a periphery of the circuit board 60 is covered and protected by the case main body 31 and the lid body 41. In addition, connector connection portions 63 are provided on one end side and one side portion of the circuit board 60. Guide holes 64 and through holes 65 are formed in the connector connection portions 63.

As shown in FIGS. 3 and 4, each of the bus bars 71 is formed of a conductive metal plate. Each of the bus bars 71 includes two fastening holes 75. These fastening holes 75 are formed at the same pitch as pitch of the electrodes 5 along the arrangement direction of the adjacent single cells 3 of the battery assembly 1. A fastening bolt (not shown) is inserted into each of the fastening holes 75. The bolt inserted into the fastening hole 75 is screwed into a screw hole 5a (see FIG. 2) formed in the electrode 5 of the single cell 3. As a result, the bus bars 71 and the electrodes 5 are fastened and electrically connected.

One end of the electric wire 72 is connected to the bus bar 71 by soldering, for example. A connection method of the electric wires 72 to the bus bars 71 is not limited to the soldering, and may be connected by crimping or the like. In addition, some of the electric wires 72 are electric wires extending from a thermistor (not shown) which detects temperatures of the single cells 3. Board-in connectors 73 are provided at the other end of the plurality of electric wires 72. Each of the board-in connectors 73 is provided with guide pins 77 and connection pins 78. The electric wires 72 configure a harness circuit body 70 together with the bus bars 71 and the board-in connectors 73.

The harness circuit body 70 including the bus bars 71, the electric wires 72, and the board-in connectors 73 is assembled to the case 20 from a front surface side thereof. Each of the bus bars 71 is held in a bus bar holding portion 22 formed in the electric wire accommodation portion 21 of the case 20. The electric wires 72 are wired along the electric wire accommodation portions 21 of the case 20, and are held in an aligned state by being fitted between the alignment plate portions 46 of the electric wire alignment portion 45 of the case 20. Further, the board-in-connectors 73 are disposed in the board accommodation space S from the opening portions 34 formed on the plate-like portion 32 of the case main body 31. The board-in connectors 73 are assembled to the connector connection portions 63 of the circuit board 60 accommodated in the board accommodation space S of the case main body 31, respectively. Specifically, the board-in connectors 73 are positioned by inserting the guide pins 77 into the guide holes 64 of the circuit board 60, and soldered and connected by inserting the connection pins 78 into the through holes 65 of the circuit board 60. Accordingly, the electric wires 72 of the harness circuit body 70 are electrically connected to a conductor pattern of the circuit board 60.

In order to assemble the bus bar module 10 including the above structure to the battery assembly 1, the case 20 of the bus bar module 10 is attached to an upper portion of the battery assembly 1, and the bus bars 71 of the harness circuit body 70 is fastened to the electrodes 5 by bolts. As a result, the power supply device 2 in which the single cells 3 of the battery assembly 1 are connected in series by the bus bars 71 is configured. In the power supply device 2 to which the bus bar module 10 is assembled, voltages and the temperatures of the single cells 3 are monitored by the voltage monitoring circuit and the temperature monitoring circuit of the circuit board 60 accommodated in the board accommodation space S of the case main body 31.

Figure 7:
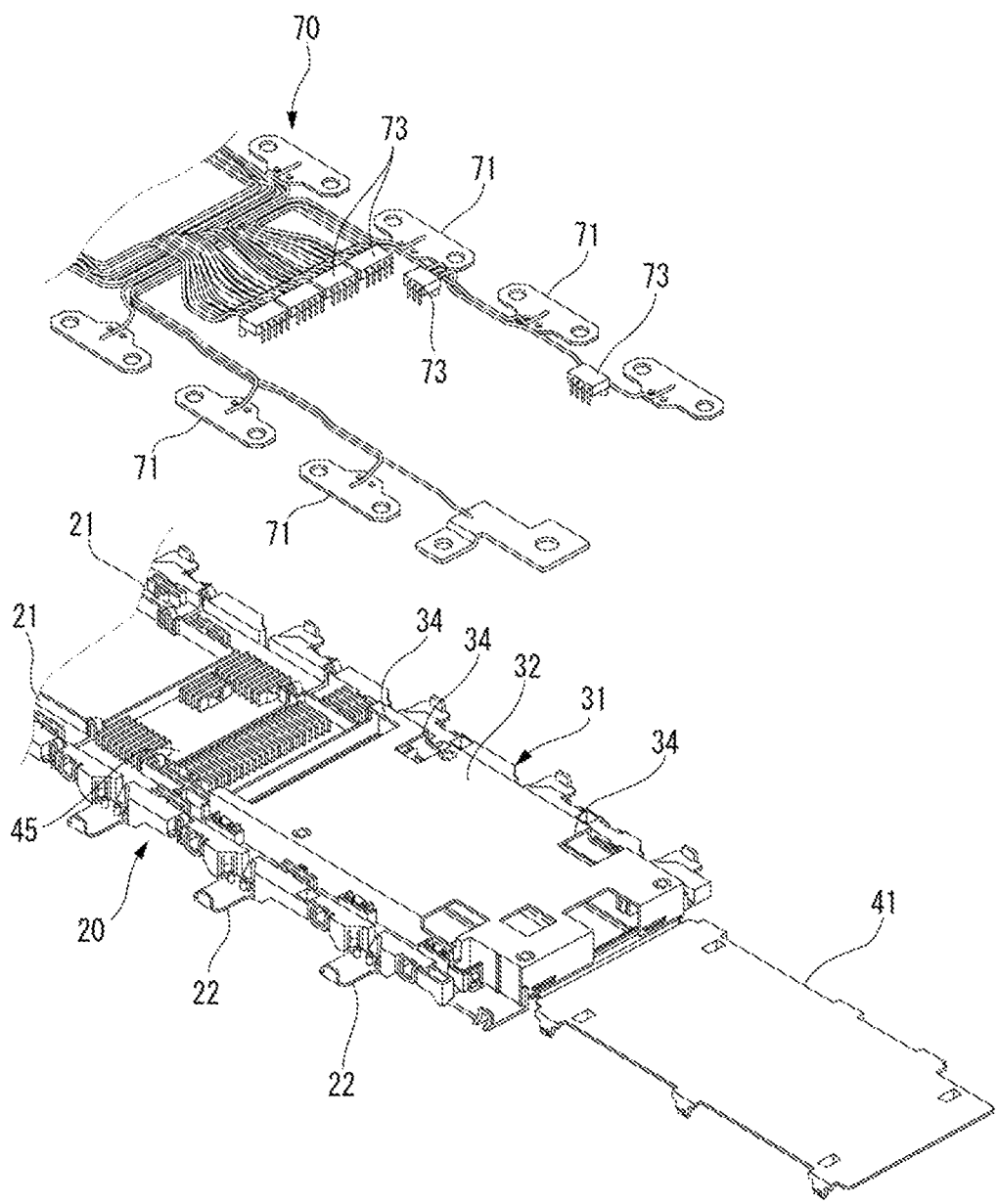
FIG. 7 is a perspective view of a case and a harness circuit body for explaining a wiring step.
Figure 8:
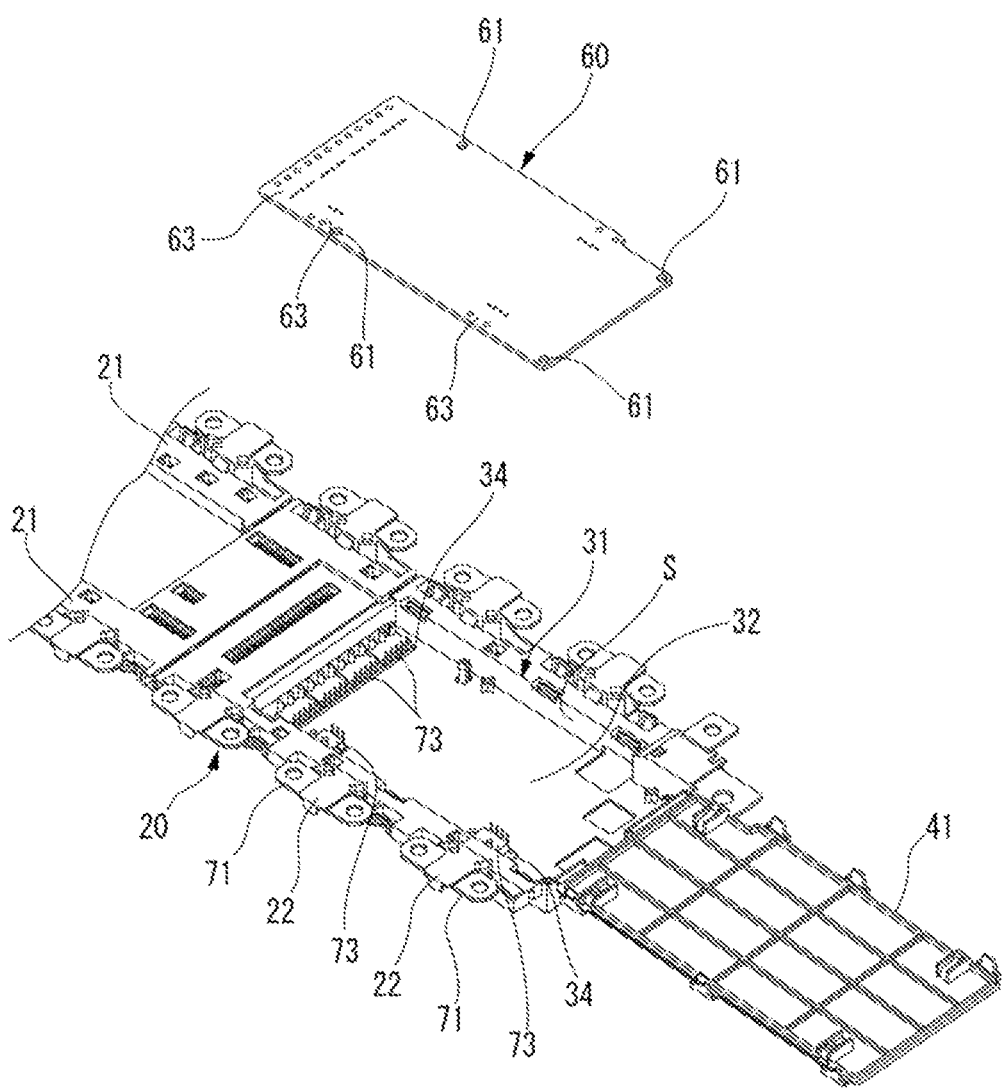
FIG. 8 is a perspective view of the case and the circuit board for explaining a board accommodating step.
Figure 9:
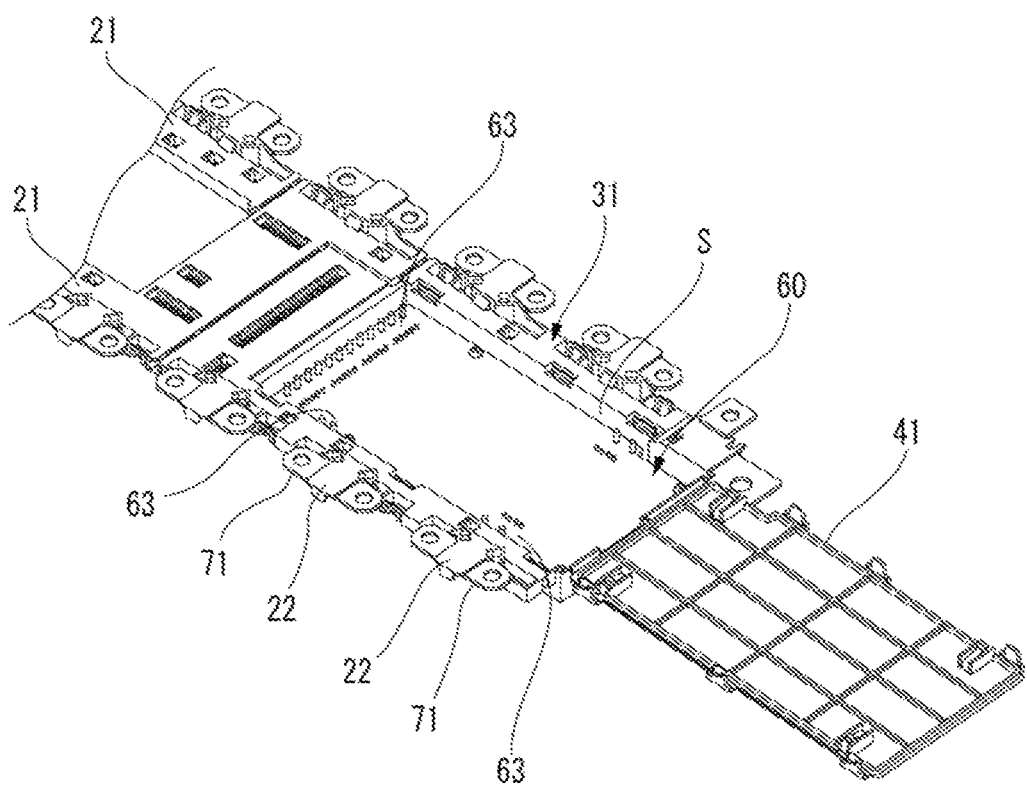
FIG. 9 is a perspective view of the case assembled with the circuit board for explaining the board accommodating step.
Figure 10:
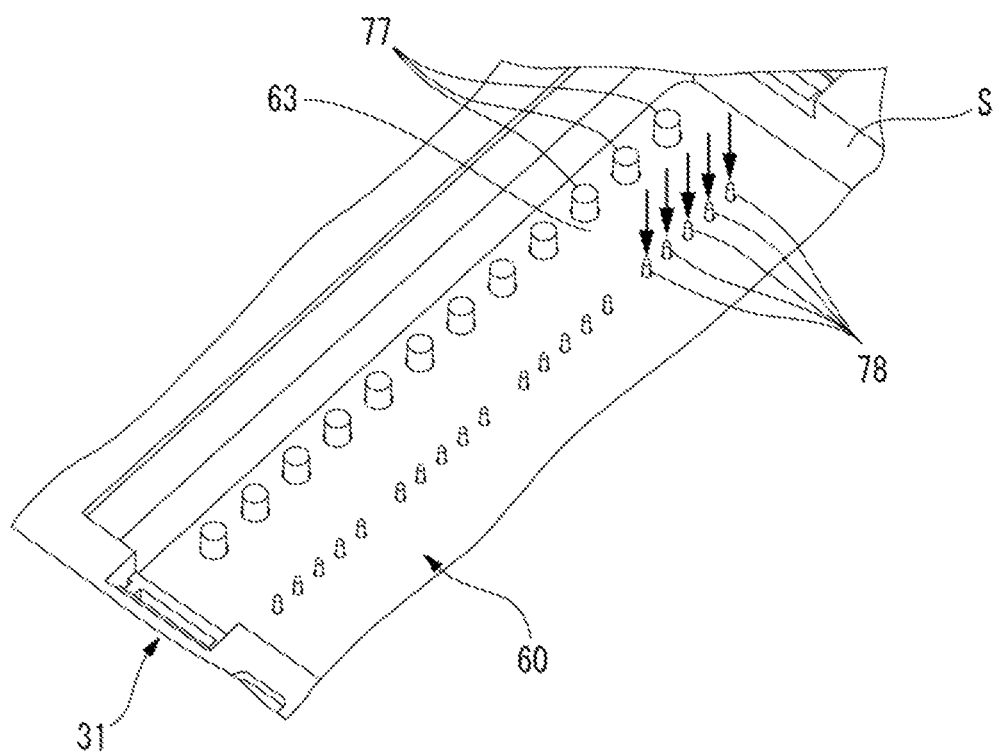
FIG. 10 is a perspective view of a part of the circuit board accommodated in the board accommodation space of the case main body for explaining a connecting step.
Figure 11:
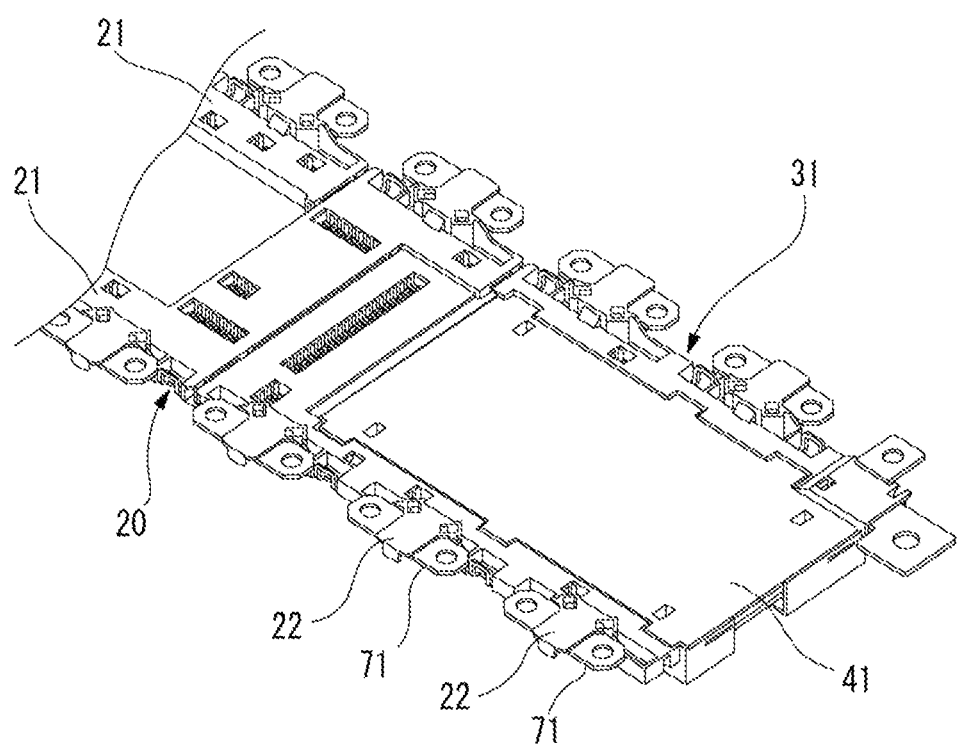
FIG. 11 is a perspective view of the case main body in which the board accommodation space is closed by a lid body for explaining a closing step, as viewed from a back surface side of the case main body.

Next, a case in which the bus bar module 10 is assembled will be described. FIG. 7 is a perspective view of the case and the harness circuit body for explaining a wiring step. FIG. 8 is a perspective view of the case and the circuit board for explaining a board accommodating step. FIG. 9 is a perspective view of the case assembled with the circuit board for explaining the board accommodating step. FIG. 10 is a perspective view of a part of the circuit board accommodated in the board accommodation space of the case main body for explaining a connecting step. FIG. 11 is a perspective view of the case main body in which the board accommodation space is closed by the lid body for explaining a closing step, as viewed from a back surface side of the case main body.

(Wiring Step)

As shown in FIG. 7, the harness circuit body 70 is assembled to the case 20 from the front surface side thereof. Specifically, each of the bus bars 71 is held in the bus bar holding portion 22 of the electric wire accommodation portion 21, and the electric wires 72 are held by the electric wire alignment portion 45. Further, the board-in connectors 73 are disposed in the opening portions 34 of the case main body 31.

(Board Accommodating Step)

As shown in FIG. 8, the circuit board 60 is attached on the case main body 31 of the case 20. Specifically, the case 20 to which the harness circuit body 70 is assembled is disposed to be turned over, and the circuit board 60 is fitted into the board accommodation space S of the case main body 31.

As shown in FIG. 9, by inserting the guide pins 77 of the board-in connectors 73 into the guide holes 64 formed in the connector connection portions 63 of the circuit board 60, the board-in connectors 73 are positioned with respect to the circuit board 60, and the connection pins 78 of the board-in connectors 73 are inserted into the through holes 65 of the circuit board 60. Further, the board locking portions 37 of the case main body 31 are locked to the locking holes 61 of the circuit board 60, and the circuit board 60 is fixed to the case main body 31. At this time, in order to smoothly attach the board-in connectors 73 to the circuit board 60, for example, the board-in connectors 73 are preferably held in a state of being positioned with respect to the case main body 31 by a jig or the like.

(Connecting Step)

The connection pins 78 of the board-in connectors 73 inserted into the through holes 65 of the circuit board 60 accommodated in the board accommodation space S of the case main body 31 are soldered to the conductor pattern of the circuit board 60. Specifically, as shown in FIG. 10, molten solder is dropped into the through holes 65 into which the connection pins 78 of the board-in connectors 73 are inserted (see an arrow in FIG. 10), and the connection pins 78 are joined to the conductor pattern (not shown) of the circuit board 60 by soldering. The connecting step in which the molten solder is dropped and the connection pins 78 are soldered to the conductor pattern can be performed by an automatic machine such as a robot, for example. The connecting step may be performed manually by a worker.

(Closing Step)

As shown in FIG. 11, when the board-in connectors 73 of the electric wires 72 are connected to the connector connection portions 63 of the circuit board 60, the lid body 41 is rotated at the connection portion with the case main body 31 to close the board accommodation space S of the case main body 31. As a result, the board accommodation space S of the case main body 31 is closed by the lid body 41, and the periphery of the circuit board 60 is covered and protected.

In the bus bar module 10 assembled as described above, a back surface side, which is an assembly side of the battery assembly 1, is directed downward, and is assembled from above with respect to the battery assembly 1.

As described above, according to the bus bar module 10 according to the present embodiment, the electric wires 72 wired in the case 20 are led from the opening portions 34 formed on a surface side of the case main body 31 opposite to the open side of the board accommodation space S to the board accommodation space S, are soldered to the circuit board 60 from the back surface side which is the open side of the case main body 31, and are electrically connected to the circuit board 60. As a result, compared with a structure including a male and female fitting connector which joins an electric wire side connector provided in the electric wires to a board side connector mounted on the circuit board, it is possible to eliminate a need for the pair of connectors to be fitted to each other, and to reduce cost, a size and weight due to a reduction in the number of components.

It is possible to eliminate a need for a worker to manually join the connectors to each other, and the electric wires 72 can be soldered and connected to the circuit board 60 by an automatic machine. As a result, assembly work efficiency can be improved, and manufacturing cost can be reduced.

In particular, by using the board-in connectors 73 soldered to the circuit board 60 with direct attachment, it is possible to easily electrically connect the electric wires 72 to the circuit board 60 while minimizing the number of components.

In a state where the board accommodation space S is opened, accommodation of the circuit board 60 in the board accommodation space S and the connection by soldering of the electric wires 72 to the circuit board 60 can be easily performed. By rotating the lid body 41 to close the board accommodation space S, the periphery of the circuit board 60 accommodated in the board accommodation space S can be covered and protected.

According to the method for assembling a bus bar module according to the present embodiment, the circuit board 60 is accommodated and protected in the board accommodation space S of the case main body 31, and the bus bar module 10 in which the electric wires 72 are electrically connected to the circuit board 60 by the board-in connectors 73 can be easily assembled, and the manufacturing cost can be reduced. In particular, the connecting step of soldering the connection pins 78 to the conductor pattern of the circuit board 60 from the back surface side of the case main body 31 in which the board accommodation space S is opened is performed by an automatic machine, so that the assembly work efficiency can be further improved.

Next, another assembling method of the bus bar module 10 will be described.

Figure 12:
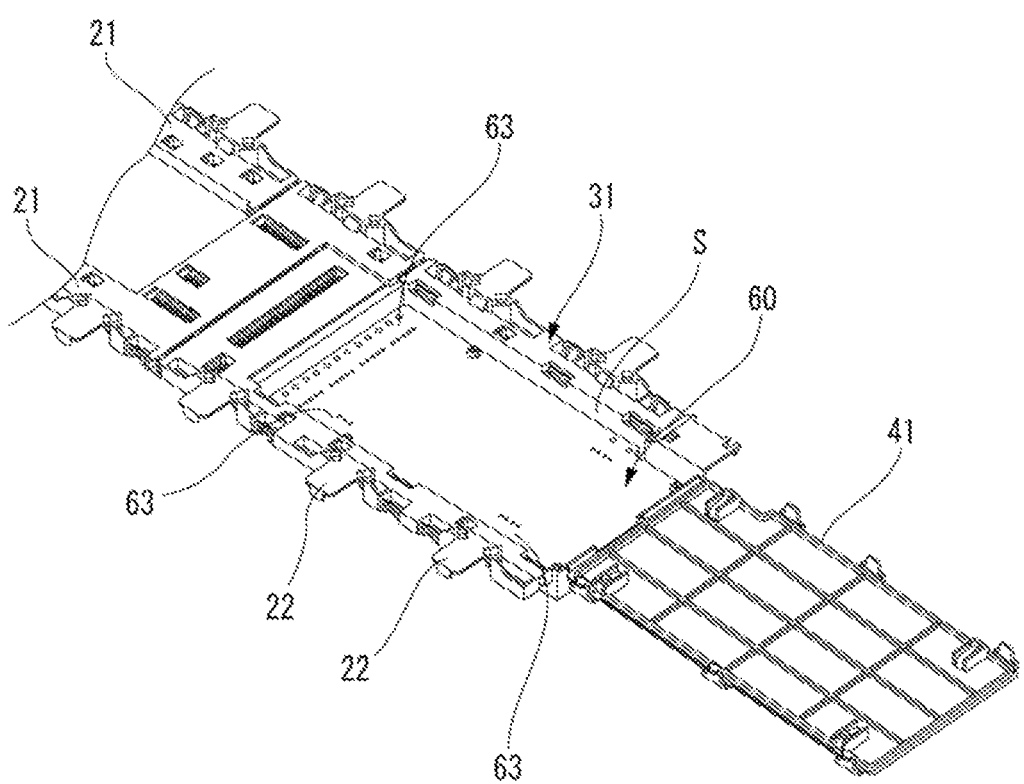
FIG. 12 is a perspective view of a case assembled with a circuit board for explaining a board accommodating step in another assembling method.
Figure 13:
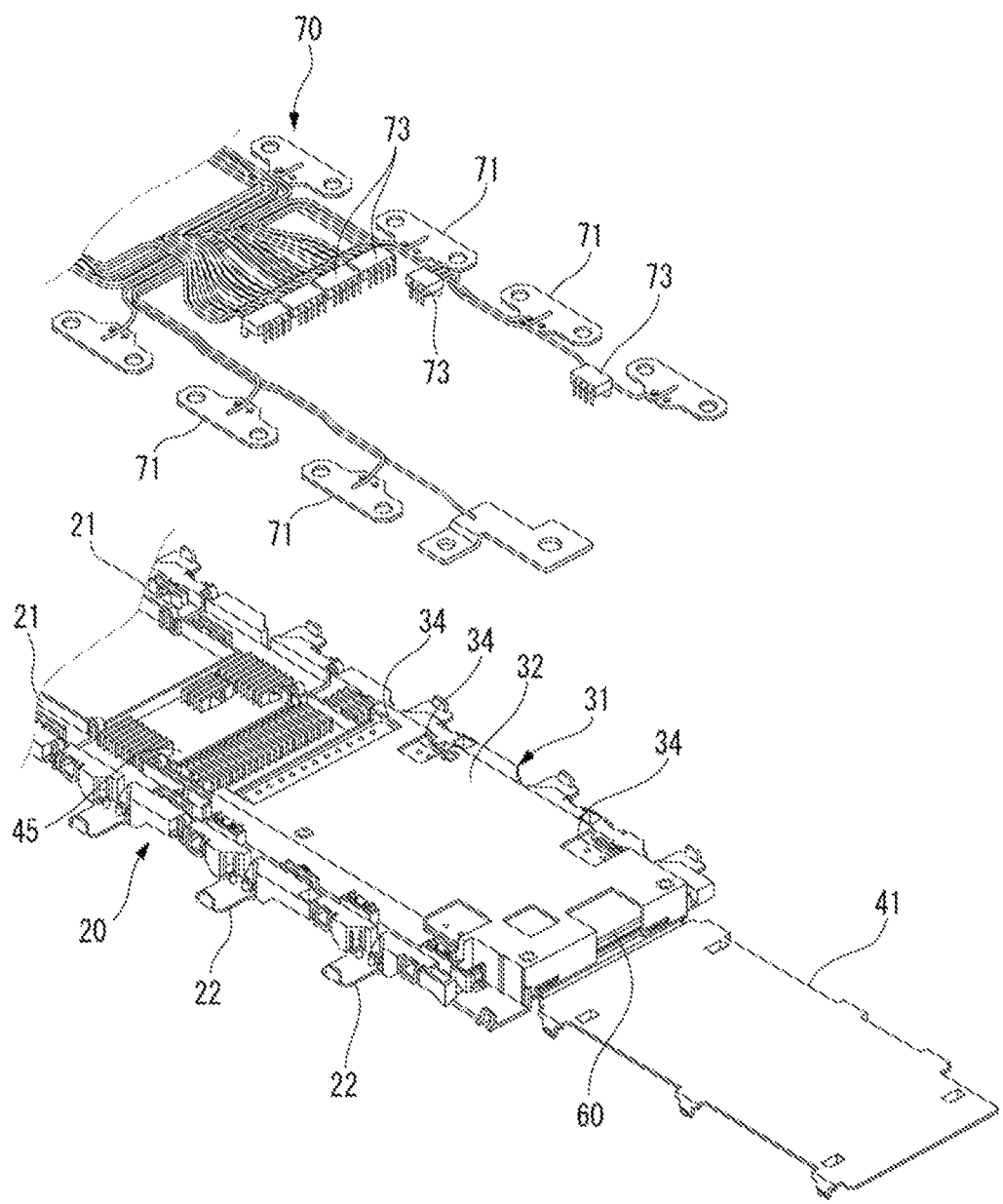
FIG. 13 is a perspective view of the case and a harness circuit body for explaining a wiring step in another assembling method.

FIG. 12 is a perspective view of a case assembled with a circuit board for explaining a board accommodating step in another assembling method. FIG. 13 is a perspective view of the case and a harness circuit body for explaining a wiring step in another assembling method.

(Board Accommodating Step)

As shown in FIG. 12, the circuit board 60 is attached on the case main body 31 of the case 20. Specifically, the case 20 is disposed to be turned over such that the back surface side thereof faces upward, and the circuit board 60 is fitted into the board accommodation space S of the case main body 31. Then, the board locking portions 37 of the case main body 31 are locked to the locking holes 61 of the circuit board 60, and the circuit board 60 is fixed to the case main body 31.

(Wiring Step)

As shown in FIG. 13, the harness circuit body 70 is assembled to the case 20. Specifically, the case 20 is inversed and disposed such that the front surface side faces upward, and each of the bus bars 71 is held in the bus bar holding portion 22 of the electric wire accommodation portion 21, and the electric wires 72 are held in the electric wire alignment portion 45. Further, the board-in connectors 73 are disposed in the opening portions 34 of the case main body 31. Then, by inserting the guide pins 77 of the board-in connectors 73 into the guide holes 64 formed in the connector connection portions 63 of the circuit board 60, the board-in connectors 73 are positioned with respect to the circuit board 60, and the connection pins 78 of the board-in connectors 73 are inserted into the through holes 65 of the circuit board 60.

(Connecting Step)

The case 20 is disposed to be turned over such that the back surface side faces upward, and the connection pins 78 of the board-in connectors 73 inserted into the through holes 65 of the circuit board 60 accommodated in the board accommodation space S of the case main body 31 are soldered to the conductor pattern of the circuit board 60 (see FIGS. 9 and 10).

(Closing Step)

When the board-in connectors 73 of the electric wires 72 are connected to the connector connection portions 63 of the circuit board 60, the lid body 41 is rotated at the connection portion with the case main body 31 to close the board accommodation space S of the case main body 31 (see FIG. 11). As a result, the board accommodation space S of the case main body 31 is closed by the lid body 41, and the periphery of the circuit board 60 is covered and protected.

In the bus bar module 10 assembled as described above, the back surface side, which is the assembly side of the battery assembly 1, is directed downward, and is assembled from above with respect to the battery assembly 1.

Also in the case of the method for assembling a bus bar module, the circuit board 60 is accommodated and protected in the board accommodation space S of the case main body 31, and the bus bar module 10 in which the electric wires 72 are electrically connected to the circuit board 60 by the board-in connectors 73 can be easily assembled, and the manufacturing cost can be reduced. In addition, the connecting step of soldering the connection pins 78 to the conductor pattern of the circuit board 60 from the back surface side of the case main body 31 in which the board accommodation space S is opened is performed by an automatic machine, so that the assembly work efficiency can be further improved.

Moreover, according to the other assembling method, since the circuit board 60 is first assembled to the case main body 31 of the case 20, an assembling workability of the board-in connectors 73 to the connector connection portions 63 of the circuit board 60 is good, and the assembly work efficiency can be further improved.

The present disclosure is not limited to the embodiments described above, and modifications, improvements, or the like can be made as appropriate. In addition, the material, shape, size, number, arrangement position, or the like of each component in the above-described embodiments are optional and are not limited as long as the present disclosure can be achieved.

For example, the lid body 41 provided in the case 20 may be separate from the case main body 31. In addition, the circuit body wired in the case 20 is not limited to the electric wire 72, and may be, for example, a circuit body such as a flexible printed wiring board (FPC).

According to an aspect of the present disclosure, a bus bar module (10) includes a case (20) which is configured to be assembled to a battery assembly (1) including a plurality of single cells (3), a bus bar (71) which is held in the case (20) and fastened to electrodes (5) of the single cells (3), a circuit body (electric wire, 72) which is connected to the bus bar (71) and is wired in the case (20), and a circuit board (60) to which the circuit body (electric wire, 72) is connected. The case (20) includes a case main body (31) formed in a concave shape and including a board accommodation space (S) in which the circuit board (60) is accommodated, and a lid body (41) attached to one side at which the board accommodation space (S) in the case main body (31) is open. The one side of the board accommodation space (S) in the case main body (31) is closed to cover a periphery of the circuit board (60) by the lid body (41) in a state where the circuit board (60) is accommodated in the board accommodation space(S). The circuit body (electric wire, 72) is led from an opening portion (34) into the board accommodation space (S), the opening portion (34) being formed on a surface of the other side opposite to the one side of the board accommodation space (S) in the case main body (31). The circuit body (electric wire, 72) is soldered to the circuit board (60) from the one side so as to be electrically connected to the circuit board (60).

According to an aspect of the present disclosure, the circuit body (electric wire, 72) includes a board-in connector (73) including a connection pin (78), formed at an end portion on a connection side with the circuit board (60). The connection pin (78) is inserted into a through hole (65) formed in the circuit board (60). The board-in connector (73) is soldered to a conductor pattern of the circuit board (60) from the one side of the case main body (31).

According to an aspect of the present disclosure, the lid body is rotatably attached to the case main body (31). The lid body (41) is rotated with respect to the case main body (31) such that the board accommodation space (S) is configured to be opened or closed at the one side.

According to the aspect of the present disclosure, the circuit body wired in the case is led from the opening portion into the board accommodation space, the opening portion being formed on a surface of the other side opposite to the one side of the board accommodation space in the case main body. And the circuit body is soldered to the circuit board from the one side so as to be electrically connected to the circuit board. As a result, compared with a structure having a male and female fitting connector which joins an electric wire side connector provided in the electric wires to a board side connector mounted on the circuit board, it is possible to eliminate a need for the pair of connectors to be fitted to each other, and to reduce cost, a size and weight due to a reduction in the number of components.

In addition, it is possible to eliminate a need for a worker to manually join the connectors to each other, and the circuit board can be soldered and connected to the circuit board by an automatic machine. As a result, assembly work efficiency can be improved, and manufacturing cost can be reduced.

According to the aspect of the present disclosure, by using the board-in connector soldered to the circuit board with direct attachment, it is possible to easily electrically connect the circuit body to the circuit board while minimizing the number of components.

According to the aspect of the present disclosure, in a state where the board accommodation space is opened, accommodation of the circuit board in the board accommodation space and the connection by soldering of the circuit body to the circuit board can be easily performed. By rotating the lid body to close the board accommodation space, a periphery of the circuit board accommodated in the board accommodation space can be covered and protected.

According to another aspect of the present disclosure, in a bus bar module (10) including a case (20) which is configured to be assembled to a battery assembly (1) including a plurality of single cells (3), a bus bar (71) which is held in the case (20) and fastened to electrodes (5) of the single cells (3), a circuit body (electric wire, 72) which is connected to the bus bar (71) and is wired in the case (20), a board-in connector (73) including a connection pin (78) provided at an end portion of the circuit body (electric wire, 72), a circuit board (60) to which the connection pin (78) of the board-in connector (73) is connected, a case main body (31) formed in a concave shape to be provided in the case (20) and including a board accommodation space (S) in which the circuit board (60) is accommodated, and a lid body (41) attached to one side at which the board accommodation space (S) in the case main body (31) is open, a method for assembling the bus bar module (10) includes a step of wiring the circuit body (electric wire, 72) in the case (20) by assembling the bus bar (71) and the circuit body (electric wire, 72) to the case (20), and disposing the board-in connector (73) from an opening portion (34) into the board accommodation space (S), the opening portion (34) being formed on a surface of the other side opposite to the one side of the board accommodation space (S) in the case main body (31), a step of accommodating the circuit board (60) into the board accommodation space (S) to insert the connection pin (78) into a through hole (65) of the circuit board (60), a step of connecting the connection pin (78) from the one side to a conductor pattern of the circuit board (60) by a soldering, and a step of closing the board accommodation space (S) by assembling the lid body (41) to the case main body (31).

According to another aspect of the present disclosure, in a the bus bar module (10) including a case (20) which is configured to be assembled to a battery assembly (1) including a plurality of single cells (3), a bus bar (71) which is held in the case (20) and fastened to electrodes (5) of the single cells (3), a circuit body (electric wire, 72) which is wired in the case (20), a board-in connector (73) including a connection pin (78) provided at an end portion of the circuit body (electric wire, 72), a circuit board (60) to which the connection pin (78) of the board-in connector (73) is connected, a case main body (31) formed in a concave shape to be provided in the case (20) and including a board accommodation space (S) in which the circuit board (60) is accommodated, and a lid body (41) attached to one side at which the board accommodation space (S) in the case main body (31) is open, a method for assembling the bus bar module (10) includes a step of accommodating the circuit board (60) into the board accommodation space (S), a step of wiring the circuit body (electric wire, 72) in the case (20) by assembling the bus bar (71) and the circuit body (electric wire, 72) to the case (20) and disposing the board-in connector (73) from an opening portion (34) into the board accommodation space (S) and inserting the connection pin (78) into a through hole (65) of the circuit board (60), the opening portion (34) being formed on a surface of the other side opposite to the one side of the board accommodation space (S) in the case main body (31), a step of connecting the connection pin (78) from the one side to a conductor pattern of the circuit board (60) by a soldering, and a step of closing the board accommodation space (S) by assembling the lid body (41) to the case main body (31).

According to the aspect of the present disclosure, the circuit board is accommodated and protected in the board accommodation space of the case main body, and the bus bar module in which the circuit body is electrically connected to the circuit board by the board-in connector can be easily assembled, and the manufacturing cost can be reduced. In particular, the connecting step of soldering the connection pin to the conductor pattern of the circuit board from the one side of the case main body in which the board accommodation space is opened is performed by an automatic machine, so that the assembly work efficiency can be further improved.

According to the aspect of the present disclosure, the circuit board is accommodated and protected in the board accommodation space of the case main body, and the bus bar module in which the circuit body is electrically connected to the circuit board by the board-in connector can be easily assembled, and the manufacturing cost can be reduced. In particular, the step of connecting soldering the connection pin to the conductor pattern of the circuit board from the one side of the case main body in which the board accommodation space is opened is performed by an automatic machine, so that the assembly work efficiency can be further improved.

Moreover, according to the assembling method, since the circuit board is first assembled to the case main body of the case, an assembling workability of the board-in connector to the circuit board is good, and the assembly work efficiency can be further improved.

REFERENCE SIGNS LIST

1 Battery assembly
3 Single cell
5 Electrode
20 Case
31 Case main body
34 Opening portion
41 Lid body
60 Circuit board
65 Through hole
71 Bus bar
72 Electric wire (circuit body)
73 Board-in connector
78 Connection pin
S Board accommodation space

What is claimed is:

1. A bus bar module comprising:
a case which is configured to be assembled to a battery assembly including a plurality of single cells;
a bus bar which is held in the case and fastened to electrodes of the single cells;
a circuit body which is connected to the bus bar and is wired in the case; and
a circuit board to which the circuit body is connected,
wherein the case includes:
a case main body formed in a concave shape and including a board accommodation space in which the circuit board is accommodated; and
a lid body attached to one side at which the board accommodation space in the case main body is open,
wherein the one side of the board accommodation space in the case main body is closed to cover a periphery of the circuit board by the lid body in a state where the circuit board is accommodated in the board accommodation space,
wherein the circuit body is led from an opening portion into the board accommodation space, the opening portion being formed on a surface of the other side opposite to the one side of the board accommodation space in the case main body, and
wherein the circuit body is soldered to the circuit board from the one side so as to be electrically connected to the circuit board.

2. The bus bar module according to claim 1,
wherein the circuit body includes a board-in connector including a connection pin, formed at an end portion on a connection side with the circuit board, and
wherein the connection pin is inserted into a through hole formed in the circuit board, and
wherein the board-in connector is soldered to a conductor pattern of the circuit board from the one side of the case main body.

3. The bus bar module according to claim 1,
wherein the lid body is rotatably attached to the case main body, and the lid body is rotated with respect to the case main body such that the board accommodation space is configured to be opened or closed at the one side.

4. A method for assembling a bus bar module, the bus bar module including a case which is configured to be assembled to a battery assembly including a plurality of single cells, a bus bar which is held in the case and fastened to electrodes of the single cells, a circuit body which is connected to the bus bar and is wired in the case, a board-in connector including a connection pin provided at an end portion of the circuit body, a circuit board to which the connection pin of the board-in connector is connected, a case main body formed in a concave shape to be provided in the case and including a board accommodation space in which the circuit board is accommodated, and a lid body attached to one side at which the board accommodation space in the case main body is open, the method comprising:
wiring the circuit body in the case by assembling the bus bar and the circuit body to the case, and disposing the board-in connector from an opening portion into the board accommodation space, the opening portion being formed on a surface of the other side opposite to the one side of the board accommodation space in the case main body;
accommodating the circuit board into the board accommodation space to insert the connection pin into a through hole of the circuit board;
connecting the connection pin from the one side to a conductor pattern of the circuit board by a soldering, and
closing the board accommodation space by assembling the lid body to the case main body.

5. A method for assembling a bus bar module, the bus bar module including a case which is configured to be assembled to a battery assembly including a plurality of single cells, a bus bar which is held in the case and fastened to electrodes of the single cells, a circuit body which is connected to the bus bar and is wired in the case, a board-in connector including a connection pin provided at an end portion of the circuit body, a circuit board to which the connection pin of the board-in connector is connected, a case main body formed in a concave shape to be provided in the case and including a board accommodation space in which the circuit board is accommodated, and a lid body attached to one side at which the board accommodation space in the case main body is open, the method comprising:
accommodating the circuit board into the board accommodation space;
wiring the circuit body in the case by assembling the bus bar and the circuit body to the case and disposing the board-in connector from an opening portion into the board accommodation space and inserting the connection pin into a through hole of the circuit board, the opening portion being formed on a surface of the other side opposite to the one side of the board accommodation space in the case main body;
connecting the connection pin from the one side to a conductor pattern of the circuit board by a soldering, and
closing the board accommodation space by assembling the lid body to the case main body.

* * * * *